Dec. 26, 1950    R. D. BECK    2,535,830
CURE TESTER FOR PLASTICS
Filed March 3, 1948

INVENTOR.
R. D. Beck
BY
attys.

Patented Dec. 26, 1950

2,535,830

UNITED STATES PATENT OFFICE 2,535,830

CURE TESTER FOR PLASTICS

Ronald D. Beck, Cambridge, Ohio, assignor to Continental Can Company, Inc., New York, N. Y., a corporation of New York Application March 3, 1948, Serial No. 12,711

7 Claims. (Cl. 73—150)

The following specification sets out in detail my improved method and related apparatus for testing the cure of thermo-setting materials such as resins and the like. In producing quantities of small articles moulded from thermo-setting resin accurate control must be observed of the minimum time required to complete the cure of the material.

A thermo-setting plastic piece that is undercured has the same appearance of hardness to an observer as a piece that is completely cured. Such resins remain relatively soft however, when incompletely cured, and unless adequate time is given to the curing it is likely that the finished articles will have areas that are undercured. Such areas will not be polymerized, therefore the product will not be uniformly hard or stable, which renders it unsatisfactory for use. In like manner the curing, when prolonged beyond the necessary period is wasteful of time and heat.

Heretofore the curing time has been determined largely by guesswork and making numerous trial pieces which results in an excessive waste of time and material. These hit or miss methods frequently result in improperly cured articles, as many variables are involved. For instance, the resinous compounds may vary in their characteristics of cure. The quantity and type of filler are examples of factors which may affect the amount of thermosetting heat required.

The thickness of the molded article is another factor which may cause variation in the heating time required since the penetration of heat is largely dependent upon the conductivity of the material selected.

In many instances the compound is injected or caused to flow along a heated wall of the mold. Such part acquires a quicker cure than a portion which is cured without extended contact with the heated mold surface.

All of these factors must be taken into account in arriving at suitable conditions. It frequently happens that the molding time is determined solely by experimentation in which successive samples are taken at various times of cure until an adequate time is arrived at. Even so, there is risk of undercure on the one hand, and on the other hand unnecessarily prolonged cure without any beneficial effect results in loss of heat and time.

My invention provides an accurate method of reliably determining the completeness of cure of an article molded from thermo-setting plastic or like material.

In carrying out this method the articles tested and found to be completely cured are not damaged or disfigured by the test and may be used for the purpose intended.

Another object of my invention is the provision of a novel apparatus by which the method is carried out on the articles being tested.

A further object of the invention is to provide a device for the intended purpose which may be incorporated in or attached to a standard testing machine.

The above and other objects of the invention will be readily understood from the following description of the preferred embodiment of the invention as illustrated on the accompanying drawing which:

Figure 1:
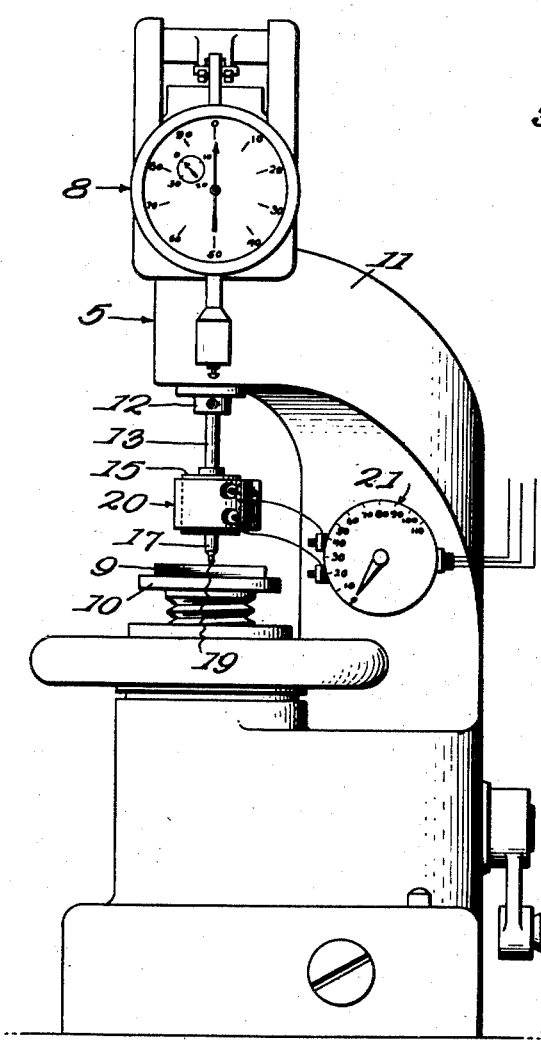
Fig. 1 is a view in elevation of a conventional machine for testing hardness to which the testing apparatus has been attached.
Figure 2:
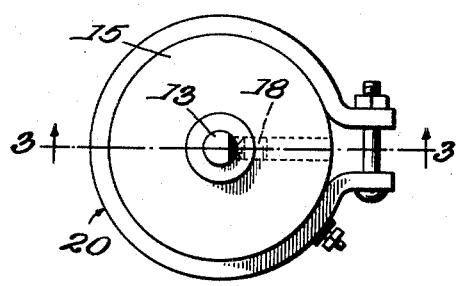
Fig. 2 is an enlarged plan view of a portion of the testing apparatus employed.

The invention depends for its operation upon the characteristic property of thermo-setting plastics and other like materials when uncured, of becoming soft or fluent under the application of heat but when adequately cured being hard enough to resist penetration. Thus the measure of penetration in the heated material is indicative of the lack of adequate cure. When a curing time is determined which provides a specimen resistant to penetration when heated, such time may be made standard for production operations. In like manner a time limit of overcuring may be arrived at beyond which further curing will be of no material benefit.

In the accompanying drawings I have illustrated a form of the well known Rockwell testing machine 5. My apparatus is preferably used with a device of this character to measure the extent to which the needle will penetrate a specimen. The measurement is read directly on the gauge 8. When an article is small and convenient in form, the test may be made directly upon the article itself, but when an article is complex or inconvenient to handle, it may be cut into sections in which case the sections should be taken where the curing operation is slowest.

The specimen or section 9 selected is mounted on a support 10.

An arm 11 overhangs the support 10 and carries a vertical slidable plunger 12. This plunger is mounted in a well known manner by linkage not shown, to the direct-reading gauge 3. The plunger is adapted to be lifted mechanically.

The bottom of the plunger has a socket to receive a spindle or rod 13. The lower end of the spindle is screw-threaded as shown at 14 to carry a preselected weight 15. This weight is preferably a ferrous metal having good heating conductivity. A socket 16 in the bottom of the weight 15 is arranged to hold a needle 17 by means of a lateral set screw 18.

The needle has a pointed end 19 designed for penetrating incompletely cured resin a distance indicative of the additional time that probably will be required for effecting a complete cure of the material.

An electric heater 20 in the form of a resistance coil or the like is permanently mounted on the periphery of the weight 15. This heater is connected to an adjustable rheostat 21 or an equivalent controlling means for maintaining the desired temperature of the weight. Heating the weight operates to maintain the needle 17 at substantially the uniform temperature desired. This action is similar to heating the point of a soldering iron. In testing the cure of the presently used thermo-setting resins a temperature of 400° F. is used. The temperature selected however, will be dependent upon the actual requirements found for the particular resinous compound.

Figure 3:
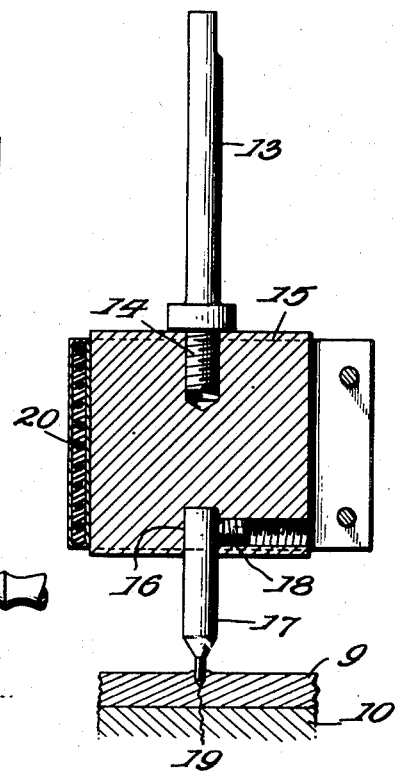
Fig. 3 is a vertical section of the same, taken on the line 3—3 of Fig. 2.

The operation or method of testing the degree of cure for an article made of thermo-setting material is illustrated in Fig. 3. The sample 9 may be the whole article or a selected part thereof.

The needle 17 receives heat by conduction from the weight 15. The needle is maintained at a substantially constant temperature, for example 400° F. by suitable regulation of the heating circuit. The needle is brought to rest upon the surface of the sample and bears down upon the latter a fixed amount measured by the weight 15, the spindle 13, the plunger 12 and associated parts. This constant weight is applied to the needle for a definite time, for example one minute.

The downward movement of the needle 17 is directly readable upon the dial of the gauge 8.

As the heated needle contacts the sample the latter reacts in accordance with its degree of cure. Fully cured material is sufficiently hard at the temperature selected to resist any appreciable penetration of the needle.

The degree of penetration, of course, depends upon the amount of the raw or uncured material. The latter under the influence of heat becomes fluent or soft and permits the weighted needle to fall faster.

Although the heat of the needle rapidly hardens the uncured material into the thermosetting state, it does not harden enough to arrest the fall of the needle before the cure takes place. In this manner the amount of penetration by the needle in a given period of time before the uncured material becomes thermo-set is a measure of the insufficiency of cure.

An almost completely cured specimen will have a very small depth of penetration while an inadequately cured sample of thermo-setting material tested under the above conditions will suffer a penetration not exceeding 0.030" when, for example, the above described needle has a pointed end of 0.062" diameter, and the load upon it is 2600 p. s. i. resulting from a weight of 220 grams. The test sample therefore remains unimpaired and may be used for the purpose originally intended. It has been found that penetration to a maximum depth of .030" is sufficient to determine cures.

Tests on samples which have been cured in a mold for periods progressively lengthened by increases of 10 seconds will indicate the shortest curing time in which a completely cured piece can be obtained.

This may then become the time selected for molding these particular articles. It will also avoid intentionally overcuring from being overly cautious and thus prevent loss of valuable time and heat.

As stated above an incompletely cured sample will have a portion of material which becomes plastic at the temperature imparted by the heated needle. The measured penetration of the needle under 2600 p. s. i. for a period of one minute indicates the additional time probably required to provide a complete cure on the basis of the time that the piece has already been subjected to heat.

The above description is particularly addressed to the preferred form of my invention. It is evident however that the invention is not limited to this form exclusively but may be varied in numerous respects as to materials, operating conditions and structural details without departing from the scope of the invention as defined in the accompanying claims.

What I claim is:

1. A machine for testing the extent of plastic thermo-setting which comprises a base for supporting a partially thermoset plastic sample whose degree of setting is to be determined, an arm spaced above the base, an indicator on the arm, a vertically slidable plunger carried by the arm and positioned over the support, means for connecting the plunger with the indicator, a needle depending from the plunger for pressure contact with the sample, and a heater for holding the needle at a substantially even degree of heat.

2. A machine for testing the extent of plastic thermo-setting which comprises a base for supporting a partially thermoset plastic sample whose degree of setting is to be determined, an arm spaced above the base, an indicator on the arm, a vertically slidable plunger carried by the arm and positioned over the support, means connecting the plunger with the indicator, a weight attached to the plunger, a needle depending from the weight, and a heater for holding the weight and the needle at a substantially uniform degree of heat.

3. A machine for testing the extent of plastic thermo-setting which comprises a base for supporting a partially thermoset plastic sample whose degree of setting is to be determined, an arm spaced above the base, an indicator on the arm, a vertically slidable plunger carried by the arm and positioned over the support, means connecting the plunger with the indicator, a weight attached to the plunger, a needle depending from the weight, a heating element means for the weight and for regulating the degree of heat applied to the weight.

4. A machine for testing the extent of plastic thermo-setting which comprises a base for supporting a partially thermoset plastic sample whose degree of setting is to be determined, an arm spaced above the base, an indicator on the arm, a vertically slidable plunger carried by the arm and positioned over the support, means connecting the plunger with the indicator, a weight attached to the plunger, a depending needle connected to the weight and having a reduced lower end for penetrating the sample, an electrically actuated heating coil fitted around the weight, means for regulating the degree of heat applied by the coil to the weight and needle.

5. A device for penetrating a yielding article which comprises a weight adapted to be mounted on a testing machine, a needle depending from the weight and a heating means for holding the weight and needle at a substantially uniform degree of heat.

6. A method of testing the extent of thermosetting in a partially thermoset plastic article which comprises placing the article on a fixed support, resting a weighted needle on the article, applying an even degree of heat to the needle sufficient to render plastic the unhardened portion of the article with which the needle is in contact, and measuring the penetration of the needle into the article.

7. The method of testing the extent of thermosetting in a partially thermoset plastic article which comprises placing the article on a fixed support, resting a weighted needle on the article, applying heat to the needle sufficient to render plastic the unhardened portion of the article with which the needle is in contact, and measuring the penetration of the needle into the article.

RONALD D. BECK.

REFERENCES CITED

The following references are of record in the file of this patent:

UNITED STATES PATENTS

| Number | Name | Date |
|---|---|---|
| 1,184,837 | Edgecomb | May 30, 1916 |
| 1,225,438 | Howard | May 8, 1917 |
| 1,565,502 | Rodler | Dec. 15, 1925 |
| 2,375,033 | Parke et al. | May 1, 1945 |